E. W. ROBINSON.
MACHINE FOR MAKING KNOCKDOWN BARRELS OR CRATES.
APPLICATION FILED JUNE 14, 1910.
985,064.
Patented Feb. 21, 1911.
4 SHEETS—SHEET 1.
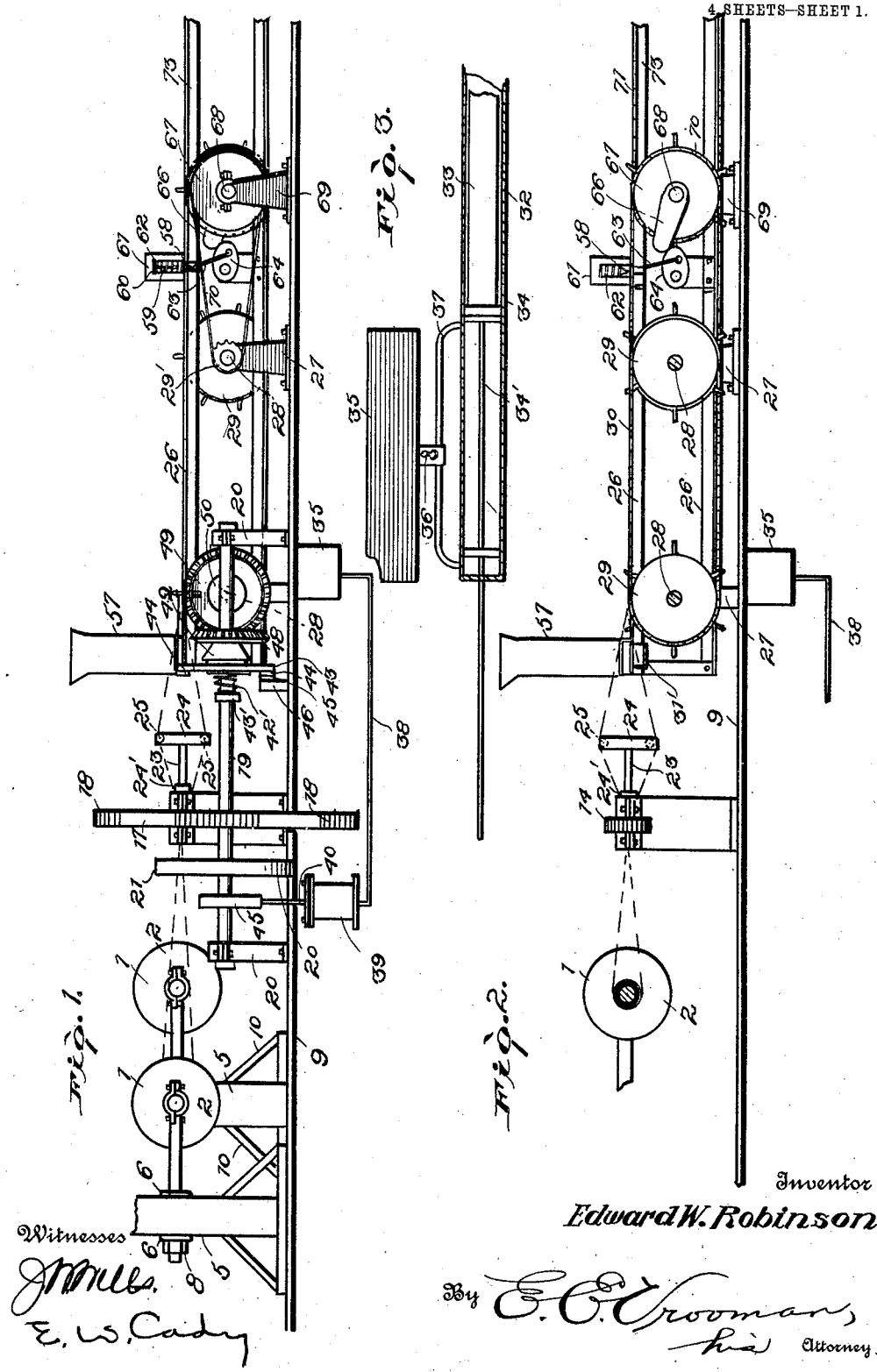
Inventor
Edward W. Robinson.

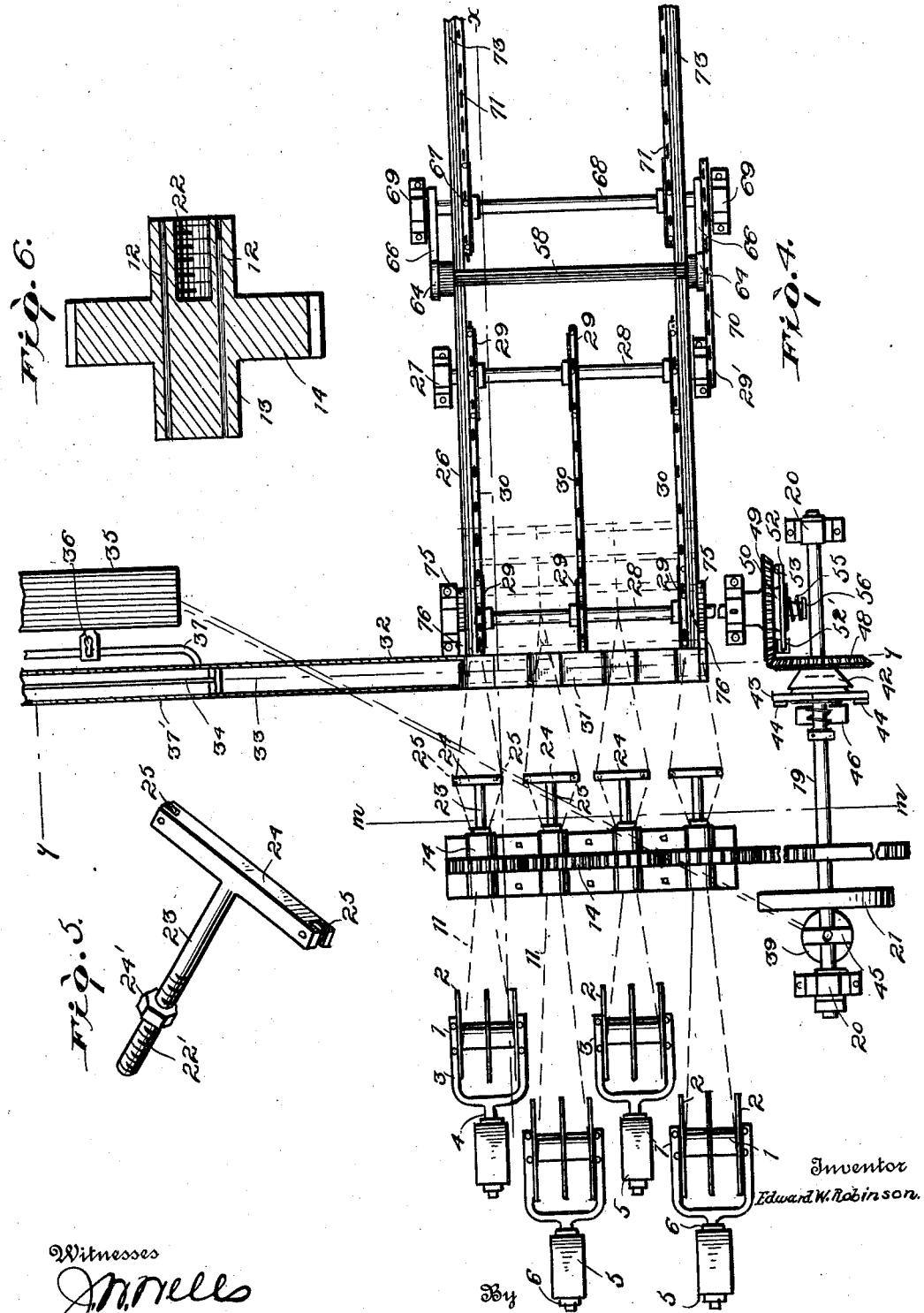

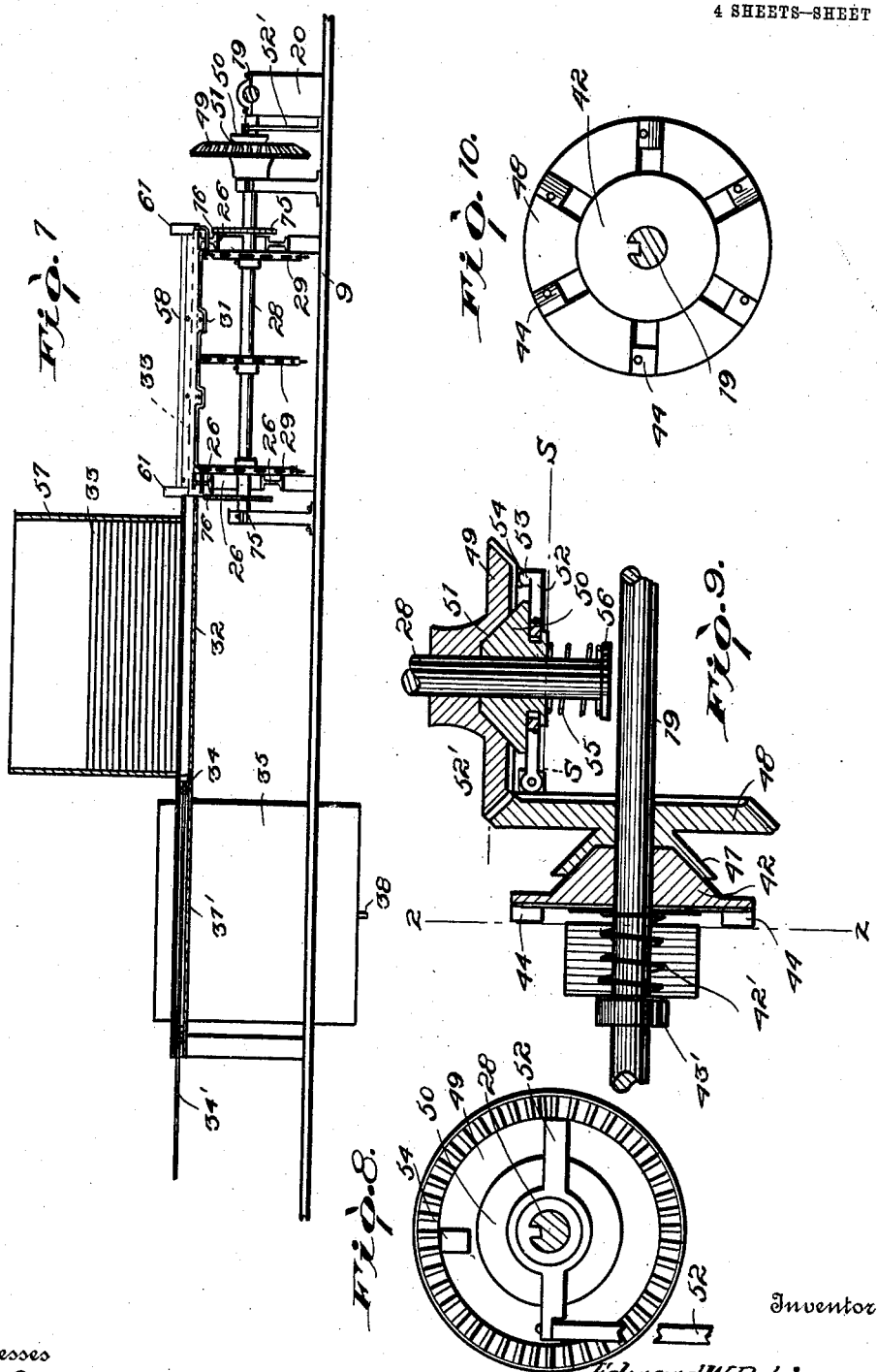

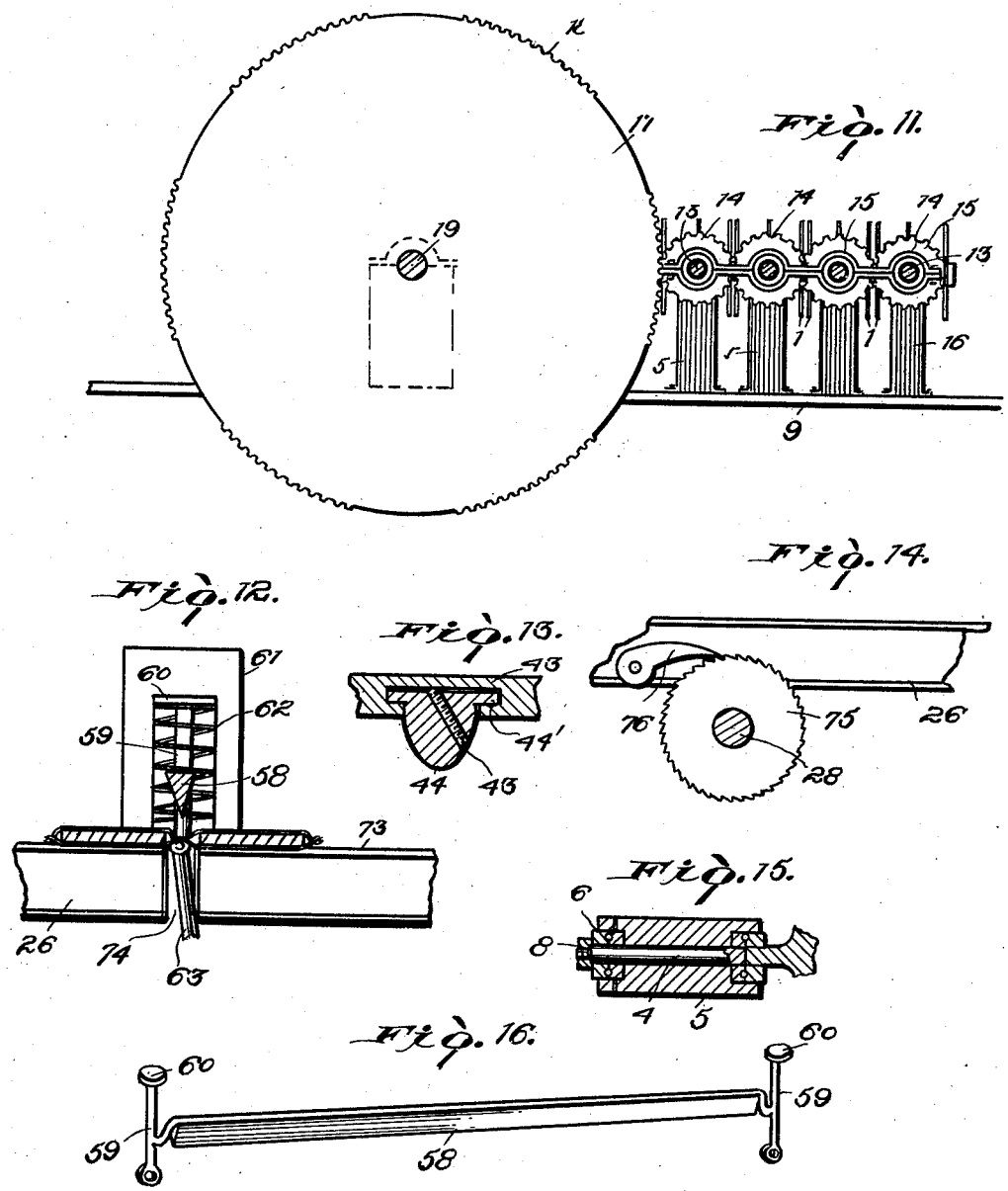

UNITED STATES PATENT OFFICE.

EDWARD W. ROBINSON, OF SAVANNAH, GEORGIA, ASSIGNOR TO TRUCKERS CRATE AND BARREL COMPANY, OF SAVANNAH, GEORGIA, A CORPORATION OF GEORGIA.

MACHINE FOR MAKING KNOCKDOWN BARRELS OR CRATES.

985,064. Specification of Letters Patent. Patented Feb. 21, 1911.

Application filed June 14, 1910. Serial No. 566,837.

*To all whom it may concern:*

Be it known that I, EDWARD W. ROBINSON, a citizen of the United States, residing at Savannah, in the county of Chatham and State of Georgia, have invented certain new and useful Improvements in Machines for Making Knockdown Barrels or Crates, of which the following is a specification, reference being had therein to the accompanying drawing.

This invention relates to machines for making slatted sections to be used as knockdown crates, or barrels and has special reference to machines of this character by means of which slats are secured together at intervals by wires twisted about said slats.

The invention has for its object to provide an improved machine of this character which will be simple in construction and effective in operation.

The invention consists of an improved machine for making slatted sections for knockdown crates or barrels and in details of construction thereof, as hereinafter set forth and claimed.

Referring to the accompanying drawings, Figure 1 is a side view of a machine constructed in accordance with this invention. Fig. 2 is a side view thereof in longitudinal section on the line x—x of Fig. 4. Fig. 3 is a detail view partly in longitudinal section and broken away of a portion of the machine for feeding the slats. Fig. 4 is a plan view of the machine. Fig. 5 is an enlarged detail view in perspective of one of the wire twisters detached. Fig. 6 is an enlarged detail view in longitudinal section of a rotary bar. Fig. 7 is an end view of the machine in cross section on the line Y—Y of Fig. 4 showing the means for feeding the slats to the machine. Fig. 8 is an enlarged detail view of one of the beveled driving gear wheels taken on the line S—S of Fig. 9. Fig. 9 is an enlarged detail view in transverse section of the intermittingly acting gear wheels. Fig. 10 is an enlarged detail view of a clutch disk taken on the line Z—Z of Fig. 9. Fig. 11 is an enlarged detail view showing the mechanism for operating the twisters taken on the line M—M of Fig. 4. Fig. 12 is an enlarged detail view partly in cross section showing the means for cutting the wires between the slats. Fig. 13 is an enlarged detail view in transverse section of a portion of the clutch mechanism. Fig. 14 is an enlarged detail view showing the means for preventing the feed rollers from turning backward. Fig. 15 is an enlarged detail view in longitudinal section of a portion of one of the twisters. Fig. 16 is an enlarged detail view in perspective of the blade for cutting the wires.

In carrying out the invention a number of drums 1 are provided on which the wires for connecting the slats are wound. The drums 1 may be of any suitable construction and as here shown preferably formed with a number of disks 2 and are each mounted in a U-shaped frame 3 having a rearwardly projecting rod 4, which extends through a hole in an upright support or post 5, and is held to turn therein by means of a number of disks 6 through which the rod 4 extends, said disks having race ways and ball bearings 7 located between their adjacent faces, and the several parts being held in position on the upright or post 5 by means of nut 8, the uprights 5 mounted on a floor 9 and braced by means of diagonal braces 10. Upon the drums 1 are mounted wires 11 indicated in the drawing by broken lines, said wires 11 extending through longitudinal holes or passage ways 12 in a short shaft 13 of a toothed wheel 14, there being a number of said toothed wheels 14 geared together as shown in Fig. 11, and mounted in bearings 15 on an upright 16 screwed to the floor 9. This train of toothed wheels meshes together and is driven by a large wheel 17 meshing with one of the wheels 14 and formed on its periphery at intervals with teeth 18, whereby an intermittent motion is imparted to the train of gear wheels 14. The large gear wheel 17 is mounted on a main driving shaft 19, said gear wheel 17 being preferably formed in two parts clamped together so that it may be removed from the main shaft 19 and other wheels substituted therefor, having a different arrangement of teeth. The main driving shaft 19 is mounted on uprights 20 secured to the floor 9 and is driven by any suitable means, as for example, by a pulley 21 mounted on the shaft 19 and connected by a belt (not shown) with any suitable power— either electricity, steam or gas. The shaft 13 is provided with a threaded socket 22 in which is detachably mounted the threaded end 22′ of the rod 23 extending from the cross bar 24 having at its ends grooved pulleys 25, the whole forming a twister for twisting the wires, a number of such twisters being provided and arranged in a row corresponding with the row of toothed wheels 14, said twisters being each held in its socket by a nut 24′. As shown the wires 11 extend from the drums 1 through the short shaft 13 and over the grooved pulleys 25 at the ends of the cross bar 24 of each of the twisters, said wires extending forward to the table over which the slats, as the wires are twisted about them, are carried.

The table over which the slats are carried is of any suitable construction, and as here shown consists of a frame work formed of pairs of upper and lower longitudinal bars 26 spaced apart from each other, and uprights 26′ at one end. Mounted in uprights 27, located at intervals apart and each side of the frame, are rotary shafts 28 on which are mounted toothed wheels 29 engaging and operated by endless chains 30. Mounted at the end of the frame at its top and opposite the twisters is a cross piece 31 having depressions 31′, on which a slat rests when it is pushed into position to have the wires twisted about the same. This bar 31 is adjacent to the front side of the toothed wheels 29 and in such relative position thereto, that after the wires have been twisted about the slat, the slat can be carried forward by means of the front pair of toothed wheels 29 engaging the said slat and carrying it forward on the belts or endless chains 30. Communicating with the bar and in alinement is a trough 32 in which—as shown in Fig. 4—is a slat 33 which is moved on to the bar 31 by means of a piston 34, and a piston rod 34′. The piston 34 is operated by any suitable means, and as here shown is preferably operated by pneumatic means; and this is provided by means of an air tank 35 from which air is supplied through a three way cock 36, connecting with a branch pipe 37 which communicates with the cylinder 37′ in which the piston 34 reciprocates. Air is supplied to the tank 35 by means of a pipe 38 which leads to the cylinder 39 of an air pump having its piston 40 connected with an eccentric 41 on the shaft 19.

In order that an intermittent timed movement may be imparted to the mechanism for operating the twisters and also to the mechanism for feeding the slats forward after the wire has been twisted about the same, suitable mechanism is provided, and as here shown preferably constructed as follows:—Mounted on the driving shaft 19 and connected thereto by a feather or spline, so as to slide thereon, is a tapering clutch 42 having a disk 43 on which are mounted buttons or projections 44, as shown in Fig. 19, adapted to be brought in contact with a button 45 on a post 46 projecting from the floor 9, as the shaft 19 rotates. The tapering clutch 42 is adapted to be seated and held in locked engagement with a correspondingly tapering socket 47 projecting from a toothed gear wheel 48 fixed to said shaft 19. The tapering clutch 42 is normally held out of engagement with the socket 47 by means of a tension spring 42′ which encircles the shaft 19 and bears at one end against a collar 43′ on the shaft 19 and at its other end against the disk 43. In the position shown in Fig. 9, the clutch 42 is in locked engagement with the socket 47, one of the buttons 44 being in engagement with the button 45 on the post 46, as shown in Fig. 1, thereby holding the spring 42′ under tension. As the shaft 19 is rotated to release the button 44 and the button 45, the spring 42′ by its reaction pulls the tapering clutch 42 out of engagement with the socket 47. The toothed wheel 48 meshes with the toothed wheel 49, which is fixed to one of the shafts 28. Slidably mounted on said shaft 28 and connected therewith by a spline or feather, so as to turn the said shaft, is a tapering wedge 50 adapted to be locked with said wheel 49 by being seated in a correspondingly shaped socket 51 in said wheel. Engaging the tapering wedge 50 is a lever 52, pivoted at one end to a post 52′, projecting from the floor 9 and having a button or projection 53 at its other end, which is adapted to bear against the button 54 on the wheel 49, and thereby, when the button 54 is brought in contact with the button 53, push back the lever 52 and release the wedge 50 from the wheel 49. When the clutch is so pushed back it compresses a spring 55 encircling the shaft 28 and bearing at one end against the clutch 50 and at its other end against a head 56 on the end of the shaft 28. By means of these two clutch devices, just described, an intermittent timed movement is imparted to the train of gearing which operates the twisters and also to the toothed wheels 29, so that, as each slat 33 is pushed by the piston 31, a wire 11 will be twisted about the slat 33 and the latter will then be moved forward by the wheels 29 and then held until another slat has been pushed on to the bar 31 when, by the action of the clutch gear mechanism, the twisters will again be set in motion and the wires twisted around the slat and the slat moved forward. The distance on the feed frame from end to end of the endless feed bands 30 is such as to sustain a number of slats connected together by the wires twisted about the same, said slats being spaced at intervals owing to said intermittent timed movement, the length of said spaced slats connected together by wires being sufficient to form a crate or barrel. It is therefore necessary to separate such sections, and for this purpose means is provided for cutting the wires, so as to provide a section of wired slats.

In Fig. 7 is shown a vertical hopper, or casing 57 in which the slats 33 are inclosed, the slats resting on top of a slat located in the trough 32. The cutting means consists, as here shown, preferably, of an elongated blade 58 which extends across the top of the frame on which the slats are fed and is located at the rear of the endless chains 30 and has its ends provided with short vertical rods 59 having a disk shaped head 60, at the upper end of each rod 59, said rods 59 being located in a vertical casing 61 on each side of the frame in which is located a coil spring 62 surrounding the rod 59, one end of said spring bearing against the under-side of the head 60 and its other end against the bottom of said casing 61. The knife 58 is normally held above the top of the frame by the tension of the springs 62 and is pulled down to cut the wires between two slats by suitable mechanism and as here shown, preferably by a lever 63, pivoted at one end to the lower end of the rods 59 and at its other end to a small cam 64 pivoted to an upright 65 mounted on the frame, said cam 64 being acted on by an arm 66 mounted on a toothed wheel 67, which in turn is mounted on a shaft 68, supported by an upright 69 on each side of the frame and operated by means of an endless belt 70, which connects with a rear toothed wheel 29 by means of a small pulley or geared wheel 29' on the shaft 28, thereby transmitting a slow motion through the endless belt 70 to the wheel 67, so as to cause the arm 66 to be brought around periodically in the revolution of the wheel 67 into and out of engagement with the cams 64, thereby timing the movement of the knife 58, so as to cause it to act and cut off the wires when the desired number of wired slats have passed by the knife 58. It will be understood that these parts are duplicated, that is to say, are on each side of the frame so that when a section of slats wired together have passed beyond the knife 58 and on to the endless chains 71 extending over the toothed-wheels 72 in the frame 73, said section of wired slats is separated by cutting the wires between two slats which have been brought beneath the knife, said cutting operation being timed by the intermittent movement of the locking gear mechanism, as hereinbefore set forth. The frames 73 and 26 are separated by a vertical space or gap 74 and thereby permit the knife to pass below the top of said frame in cutting the wires, as shown in Fig. 12.

The buttons or projections 44 may be adjusted radially on the disk 43, so as to adjust the same for the timed movement of the parts, said adjustment being shown in Fig. 13, where the button 44 provided with a flanged portion 44', which is slidable in a slot 43, is held by a set screw 45'.

In order that the toothed wheels 29 and 67 may not turn backward by the pull of the wire slats they are provided with suitable means for that purpose, as for example, by the device shown in Fig. 14 which consists of a ratchet wheel 75 mounted on the end of the shafts 28 or 68 and controlled by a pawl 76 pivoted to the frame 26.

From the foregoing description, it will be seen that the slats being fed downward— one at a time—from the hopper or casing, will be moved into position between the wires, so that the latter may be twisted about the slats, said movement taking place in one revolution of the twisters, said movement then stopping owing to the clutch gear device hereinbefore set forth and then in the further movement of the main driving shaft the feed mechanism being brought into play and feeding the wired slats forward and then stopping, a successive slat being fed from the trough to the bar at the front end of the feed frame or table by the intermittent timed movement, and the previously wired slat being moved forward. By this intermittent timed movement a section of spaced slats are wired together and moved beyond the cutting blade and the wires then separated, and this operation being repeated section after section of wired slats are fed forward to a suitable place of deposit.

Having described the invention I claim:

1. In a machine of the character described, a set of rotary frames each containing a wire drum, sets of rotary twisting devices in alinement with said drums, feeding mechanism for engaging and drawing forward sets of wired slats, means for moving one slat at a time on to said feeding mechanism in front of said twisters, and an intermittent timed operating mechanism for intermittingly operating said twisters and drums and said feed mechanism.

2. In a machine of the character described, sets of rotary frames, a rotary drum for coiling the wire about it in each frame, a train of gear mechanism in alinement with said drums, rotary wire twisting devices connected with said gear mechanism, a feed mechanism located in front of said twisting devices, means for feeding one slat at a time in front of said twisting devices on to said feed mechanism, means for cutting off sections of slats connected together and an intermittingly timed mechanism for intermittingly operating said twisters and drums and said feed mechanism and said cutting mechanism.

3. In a machine of the character described, a number of wire winding reels, a number of rotary twisters located in advance of said reels and each comprising a rotary shaft and a cross head, a frame having a support at its forward end for a slat, means for feeding slats successively to said support, a feed mechanism adjacent to said support provided with rotary toothed wheels for engagement with said slats after wires have been twisted about the same, a second feed mechanism provided with toothed wheels for engaging said slats, a cutting device located between said feed mechanisms, and intermittent timed operating mechanisms for intermittingly rotating said twisters, feeding a section of slats forward and cutting off the twisted slats in section.

4. In a machine of the character described, a number of rotary wire winding drums formed with spaced disks, a train of gear wheels arranged in advance of said drums, the shaft of each of said gear wheels formed with a passageway for the passage of wires from the drums, T shaped twisters, provided with guide rollers and detachably mounted in the shafts of said gear wheels, a frame located in advance of said twisters provided with two sets of feed mechanisms, a cutting device located between said sets of feed mechanisms, a support for a slat at the forward end of said frame, a trough connected with said support, a cylinder and piston connected with said trough, means for supplying slats one at a time to said trough, and an intermittingly acting driving mechanism connected with said gear wheels of the twisters and with the feed mechanisms and the cutting device whereby as the wires are twisted about the slats and they are fed forward a step by step motion will be given to the wired slats.

5. In a machine of the character described, a number of rotary frames having ball bearing supports, a wire winding drum mounted in the frame, a train of toothed wheels geared together, each of said wheels having a short shaft with a threaded socket, a number of T shaped twisters having guide rollers and detachably mounted in said shaft, a frame, two sets of feed mechanisms in said frame each consisting of rotary shafts and sets of beveled slots on said shafts, endless belts connecting said toothed wheels, said toothed wheels serving to feed forward the slats, a vertical movable cutting blade located between said feed mechanism, an intermittingly operated mechanism connecting said blades with said feeding mechanism, a mechanism for feeding slats successively to the front of said frame, a main driving shaft, a mutilated gear wheel on said shaft connected with said train of gear wheels, a beveled gearing connecting said driving shaft with the feed mechanism, and means for automatically throwing said gear mechanism into and out of engagement so as to intermittently operate said feed mechanism.

6. In a machine of the character described, a number of rotary wire winding drums, a number of T shaped twisters located in advance of said drums, an intermittingly operated mechanism for intermittingly operating said twisters, a frame having sets of feed mechanisms, a vertically movable knife located between said feed mechanisms, and a cam operating mechanism connected with said vertically movable knife, and intermittently operated by said feed mechanisms, a gear mechanism connected with the feed mechanism, means for automatically moving said gear mechanism into and out of operative position, and means for moving slats successively into position to be connected by the twisting wires and to be fed forward by the feed mechanisms.

7. In a machine of the character described, a train of toothed wheels each having a short shaft with passage ways through the same, a T shaped twister detachably mounted in each of said shafts and provided with guide rollers, a main driving shaft, a mutilated gear wheel connected with said set of gear wheels, a frame, sets of feed mechanisms mounted in said frame and consisting of rotary shafts, wheels with teeth projecting from their periphery mounted on said shafts, endless belts connecting said wheels, a cutting device located between said sets of feed mechanisms, a cam mechanism connected with said cutting device and with said feed mechanisms, a beveled gear wheel mounted on the main driving shaft, a beveled gear wheel mounted on one of the shafts of the feed mechanisms and meshing with said first named gear wheel and an automatically operating spring controlled clutch movable into and out of engagement with each of said beveled gear wheels for producing a timed intermittent movement thereto.

8. In a machine of the character described, feed mechanism for feeding wired slats, consisting of a frame having two sets of feed mechanisms, each consisting of transverse rotary shafts, sets of wheels mounted on said shaft, each wheel being provided with teeth projecting from its periphery, endless belts connecting said wheels, a vertically movable knife located between said sets of feed mechanisms, a rotary cam, a lever connecting said cam with said knife, a toothed wheel having a cam lever movable at intervals into connection with said cam, a small wheel mounted on the shaft of one of said feed mechanisms, and an endless belt connecting said wheel with said toothed wheel.

9. In a machine of the character described, two sets of feed mechanisms, a vertically movable knife located between said sets of feed mechanisms, springs for holding said knife in an elevated position, and a cam lever mechanism connected with said knife and with said feed mechanisms.

10. In a machine of the character described, a set of rotary wire winding drums, a set of rotary T shaped wire twisters with guide pulleys located in advance of said drums, a main driving shaft, a train of gearing for rotating said twisters, a mutilated gear wheel on said driving shaft connecting said gearing, a frame, sets of feed mechanisms in said frame consisting of rotary shafts, sets of toothed wheels mounted on said shafts, endless belts connecting said shafts and wheels, operative mechanisms connecting said feed mechanisms, a beveled gear wheel on one of the rotary shafts of said feed mechanisms, said wheel having buttons on its face, a clutch on said shaft movable into and out of engagement with said beveled gear wheel, and having a pivoted lever with a knob at its end and a tension spring on said shaft bearing against the clutch, a second beveled wheel mounted on the main driving shaft, and meshing with the first named gear wheel, a clutch on said shaft movable into and out of engagement with said beveled gear wheel, and having a disk provided with buttons adjacent to its periphery, a tension spring normally holding said clutch out of engagement with said beveled gear wheel, and a post having a button or projection adapted to be engaged by the buttons or projections on said disk, and means for feeding one slat at a time into position to be engaged by the wires and feeding the slats forward after the wires have been twisted about the same.

11. In a machine of the character described, a set of rotary frames each mounted on a fixed support and containing a wire winding drum mounted transversely therein, a set of rotary twisting devices each in alinement with one of said drums, a feeding mechanism located in advance of said twisting devices, and provided with means for engaging and drawing forward the wired slats, means for moving one slat at a time on to said feeding mechanism in front of said twisters, and an intermittent timed operating mechanism connected with said slat feeding mechanism and said twisters, and adapted to intermittingly operate said twisters and said feeding mechanism.

In testimony whereof I hereunto affix my signature in presence of two witnesses.

EDWARD W. ROBINSON.

Witnesses:
JAMES H. BYINGTON,
GEORGE H. MEINERT.